(12) United States Patent
Chen et al.

(10) Patent No.: US 10,921,580 B2
(45) Date of Patent: Feb. 16, 2021

(54) SYSTEMS AND METHODS OF INCREASING PUPIL SIZE IN A DISPLAY SYSTEM

(71) Applicant: Microsoft Technology Licensing, LLC, Redmond, WA (US)

(72) Inventors: Fei Chen, Woodinville, WA (US); Joshua Owen Miller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 304 days.

(21) Appl. No.: 15/914,698

(22) Filed: Mar. 7, 2018

(65) Prior Publication Data

US 2019/0278076 A1    Sep. 12, 2019

(51) Int. Cl.
*G02B 26/08*    (2006.01)
*G02B 26/10*    (2006.01)
*G02B 27/01*    (2006.01)

(52) U.S. Cl.
CPC ....... *G02B 26/0833* (2013.01); *G02B 26/101* (2013.01); *G02B 27/0172* (2013.01); *G02B 2027/0123* (2013.01); *G02B 2027/0178* (2013.01)

(58) Field of Classification Search
CPC .. G02B 26/0833; G02B 13/08; G02B 26/101; G02B 27/0172; G02B 2027/0123; G02B 2027/0138; G02B 2027/014; G02B 2027/0178; G02B 26/08; G02B 26/10; G02B 26/0816–108; G02F 1/1335; G06T 19/006; G06F 3/011; G06F 3/04815
See application file for complete search history.

(56) References Cited

U.S. PATENT DOCUMENTS

| 5,596,339 | A | 1/1997 | Furness et al. |
| 2016/0187646 | A1 | 6/2016 | Ehrmann |
| 2017/0176745 | A1 | 6/2017 | Poon et al. |

OTHER PUBLICATIONS

"International Search Report & Written Opinion Issued in PCT Application No. PCT/US2019/020157", dated Jul. 10, 2019, 12 Pages.

*Primary Examiner* — Wen Huang
(74) *Attorney, Agent, or Firm* — Ray Quinney & Nebeker P.C.; John O. Carpenter (57) ABSTRACT

A display system for presenting visual information to a user includes a fast scan mirror, a slow scan mirror, and anamorphic relay optics positioned optically between the fast scan mirror and slow scan mirror. The fast scan mirror has a fast scan arc in a scan direction of a display light provided by a light source. The slow scan mirror has a slow scan arc in a cross-scan direction of the display light that is perpendicular to the scan direction. The anamorphic relay optics are configured to magnify the display light in the cross-scan direction.

20 Claims, 7 Drawing Sheets

SYSTEMS AND METHODS OF INCREASING PUPIL SIZE IN A DISPLAY SYSTEM

CROSS-REFERENCE TO RELATED APPLICATIONS

N/A

BACKGROUND OF THE DISCLOSURE

Augmented reality (AR) and mixed reality (MR) display systems allow a user to experience visual information presented from a computer simultaneously with ambient light from the user's surroundings. One method for allowing a user to view their surroundings while receiving additional visual information introduced in their field of view is a waveguide. A waveguide allows ambient light to reach a user's eyes, while also allowing light from a display device to be directed to the user's field of view and combined with the ambient light.

Visual information is displayed on the waveguide by directing display light through the waveguide. The display light may be generated by a light source optically connected to the waveguide through one or more optical elements. The field of view of the visual information provided through the waveguide is related to the pupil size of the light in-coupled to the waveguide. In a microelectromechanical system (MEMS) display system, movable mirrors relay the display light from the light source to the waveguide. Due to high frequency of the mirror movement, increasing the size of the mirror may degrade the image quality (due to distortion of the mirror surface), increase cost, increase power consumption, and reduce reliability of the display system.

SUMMARY

In some embodiments, a display system for presenting visual information to a user includes a fast scan mirror, a slow scan mirror, and anamorphic relay optics positioned optically between the fast scan mirror and slow scan mirror. The fast scan mirror has a fast scan arc in a scan direction of a display light. The slow scan mirror has a slow scan arc in a cross-scan direction of the display light that is perpendicular to the scan direction. The anamorphic relay optics are configured to magnify the display light in the cross-scan direction.

In other embodiments, a display system of presenting visual information to a user includes a laser light source, a fast scan mirror, a slow scan mirror, anamorphic relay optics, and a waveguide. The laser light source is configured to provide a display light to the fast scan mirror. The fast scan mirror has a fast scan arc in a scan direction of the display light. The slow scan mirror has a slow scan arc in a cross-scan direction of the display light that is perpendicular to the scan direction. The anamorphic relay optics are positioned optically between the fast scan mirror and slow scan mirror and configured to magnify the display light in the cross-scan direction. The waveguide is positioned to receive display light from the slow scan mirror and in-couple the display light into the waveguide.

In yet other embodiments, a method of presenting visual information to a user includes providing a display light to anamorphic relay optics; reflecting the display light with a first mirror in a first scan arc in a scan direction; magnifying the display light in a cross-scan direction with a plurality of optical elements in the relay optics to create a magnified display light, the cross-scan direction being perpendicular to the scan direction; reflecting the magnified display light with a second scan mirror in a second scan arc in the cross-scan direction to create an output light; and in-coupling the output light into a waveguide.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 5-1 is a side view of anamorphic relay optics, according to some embodiments of the present disclosure;

FIG. 5-2 is a perspective view of the anamorphic relay optics of FIG. 5-1;

FIG. 8-1 is a side view of yet another example of anamorphic relay optics, according to some embodiments of the present disclosure;

FIG. 8-2 is a top view of the anamorphic relay optics of FIG. 8-1;

FIG. 9-1 is a side view of a further example of anamorphic relay optics, according to some embodiments of the present disclosure;

FIG. 9-2 is a perspective view of the anamorphic relay optics of FIG. 9-1.

DETAILED DESCRIPTION

This disclosure generally relates to devices, systems, and methods for providing visual information to a user. More specifically, the present disclosure relates to delivering light to a waveguide providing visual information to a user. In some embodiments, visual information may be provided to a user by a near-eye display. A near-eye display may be any display that is positioned near a user's eye, either to supplement a user's view of their surroundings, such as augmented or mixed reality devices, or to replace the user's view of their surroundings, such as virtual reality devices. In some embodiments, an augmented reality or mixed reality device may be a head-mounted display (HMD) that presents visual information to a user overlaid on the user's view of their surroundings. For example, the visual information from the HMD may be combined with ambient or environment light to overlay visual information, such as text or images, on a user's surroundings.

In some embodiments, the user's field of view may be at least partially encompassed by a waveguide through which the user views their surroundings. The waveguide may direct display light from a light engine to the user's field of view. The waveguide may guide the display light before outcoupling the light. Upon outcoupling the light, the waveguide may combine the visual information of the display light with ambient light from the user's surroundings to deliver the visual information to the user. Overlaying the visual information from the HMD on the user's surroundings may require precise generation and positioning of the visual information relative to the user's eyes. Matching a brightness, contrast, or color temperature of the visual information to the ambient light and surrounding physical environment may provide a more comfortable and intuitive experience for a user.

Figure 1:
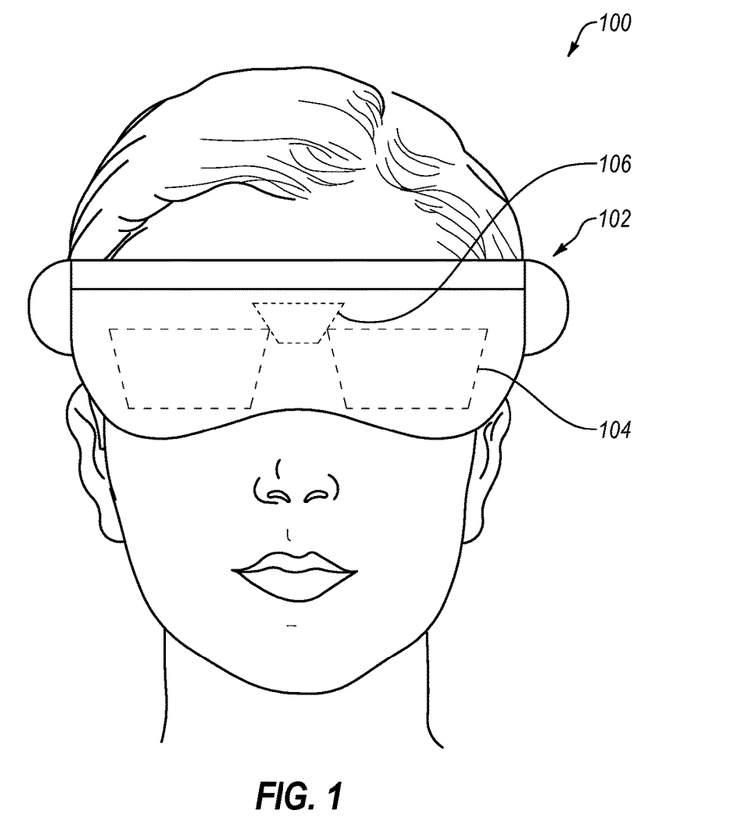
FIG. 1 is a perspective view of a head-mounted display (HMD) including a waveguide, according to at least one embodiment of the present disclosure.

FIG. 1 is a perspective view of a user 100 wearing a HMD 102. In some embodiments, the HMD 102 may have a waveguide 104 positioned near the user 100 to direct visual information to the user 100. The HMD 102 may include a single waveguide 104, a separate waveguide 104 for each of the user's eyes (i.e., two waveguides 104), or more than two waveguides 104 to provide visual information over a larger field of view.

In some embodiments, the waveguide 104 may include surface relief gratings (SRG) to extract the visual information from the total internal reflection of the waveguide 104. The SRG may outcouple visual information that is provided to the waveguide 104 by one or more electronic components of the HMD 102. In some embodiments, the HMD 102 may include one or more processors, storage devices, power supplies, audio devices, display devices, cameras, communication devices, or combinations thereof, that receive, collect, store, process, or calculate information that is provided to the user. For example, a light engine 106 may be positioned optically adjacent the waveguide(s) to provide visual information to the waveguide(s) 104.

The light engine 106 may produce display light that is in-coupled into the waveguide 104 to provide visual information to the user 100. The light engine 106 may include relay optics to transmit the display light from a light source in the light engine 106 to the waveguide 104.

Figure 2:
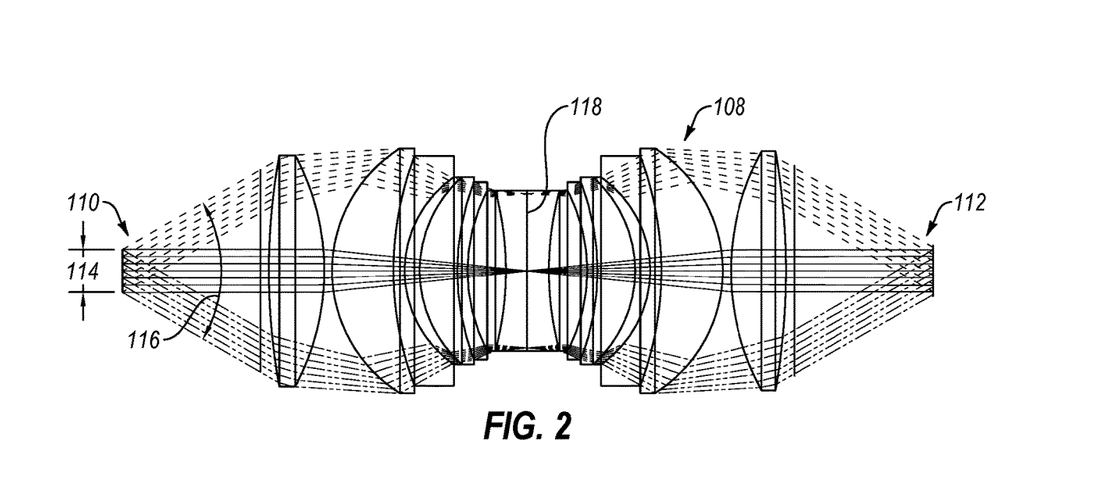
FIG. 2 is a side view of conventional relay optics in a display system.

FIG. 2 is a schematic view of conventional relay optics 108 in a display system. The relay optics 108 transmit a display light from a first mirror 110 to a second mirror 112. The first mirror 110 may be a microelectromechanical systems (MEMS) mirror. The first mirror 110 may define an input pupil diameter 114 that receives the display light from a light source. The first mirror 110 may oscillate through a first scan arc 116 in a plane oriented in a scan direction. The display light may be directed through a series of optical elements, symmetrical about an intermediate image plane 118, to the second mirror 112. The second mirror 112 may also be a MEMS mirror that oscillates in a cross-scan direction that is perpendicular to the plane of the scan direction.

The first and second mirrors 110, 112 may operate in concert to scan the display light over an area to generate frames of a display image. For example, the first mirror 110 may oscillate at a high rate, approximating a single horizontal line of a frame of the display image, while the second mirror 112 may scan at a lower rate to scan the "line" created by the first mirror 110 vertically across the frame. By correlating the positions of the first mirror 110 and the second mirror 112 with the color and/or brightness of the display light generated by a light source, the relay optics 108 and mirrors 110, 112 may create a frame of visual information.

Figure 3:
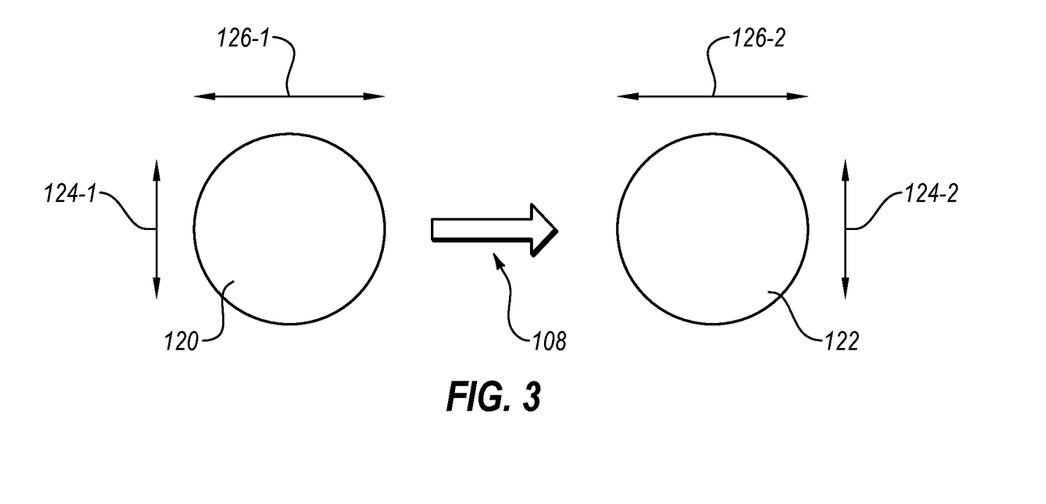
FIG. 3 is a schematic representation of the input and output pupils of conventional relay optics.

FIG. 3 is a schematic representation of the input pupil 120 and output pupil 122 of the conventional imaging system described in relation to FIG. 2. Conventional relay optics 108 transmit the display light from the first mirror to the second mirror without altering the size or aspect ratio of the display light. For example, the input pupil 120 has an input pupil height 124-1 and an input pupil width 126-1 that are equal (i.e., the input pupil 120 has a 1:1 aspect ratio). Similarly, the output pupil 122 has an output pupil height 124-2 and an output pupil width 126-2 that are equal (i.e., the output pupil 122 has a 1:1 aspect ratio). Additionally, the input pupil height 124-1 and output pupil height 124-2 are the same, and the input pupil width 126-1 and output pupil width 126-2 are the same.

Figure 4:
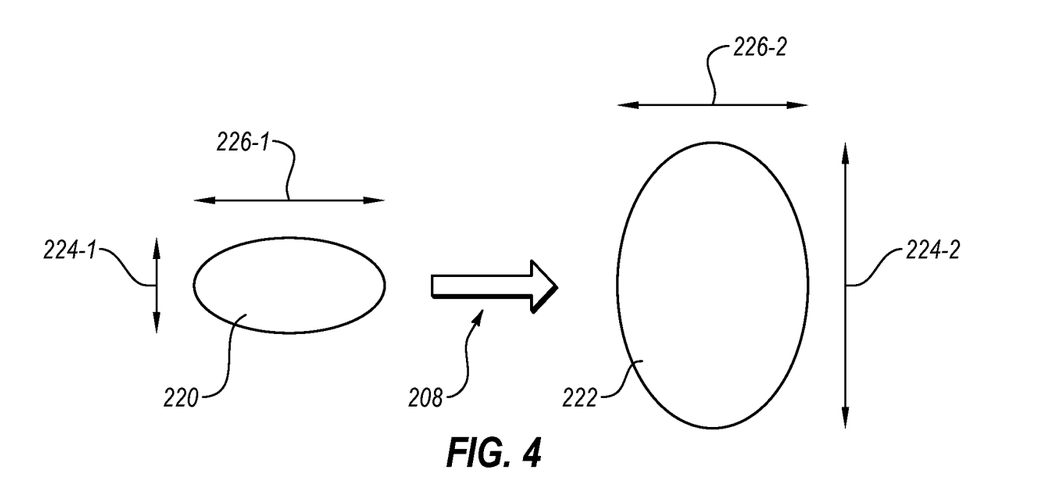
FIG. 4 is a schematic representation of input and output pupils, according to some embodiments of the present disclosure.

In some embodiments, relay optics according to the present disclosure may have input pupil and output pupil that are different in aspect ratio, area, height, width, or combinations thereof. For example, FIG. 4 illustrates an embodiment of an input pupil 220 transmitted through relay optics 208 to an output pupil 222 that is different from the input pupil 220. For example, the input pupil 220 may have an input aspect ratio (i.e., the input pupil width 226-1 to the input pupil height 224-1) and the output pupil 222 may have an output aspect ratio (i.e., the output width 226-2 to the output pupil height 224-2). The input aspect ratio may be different from the output aspect ratio.

In some embodiments, the input pupil 220 may have an input aspect ratio that is in a range having an upper value, a lower value, or upper and lower values including any of 8:1, 6:1, 4:1, 3:1, 2:1, 1.5:1, 1:1, 1:1.5, 1:2, 1:3, 1:4, 1:6, 1:8, or any values therebetween. For example, the input aspect ratio may be less than 8:1. In other examples, the input aspect ratio may be greater than 1:8. In yet other examples, the input aspect ratio may be between 8:1 and 1:8. In further examples, the input aspect ratio may be between 4:1 and 1:4. In yet further examples, the input aspect ratio may be between 2:1 and 1:2. In the embodiment illustrated in FIG. 4, the input aspect ratio may be 2:1. For example, the input pupil 220 may have an input pupil height 224-1 of 1.0 millimeter (mm) and an input pupil width 226-1 of 2.0 mm.

In some embodiments, the output pupil 222 may have an output aspect ratio that is in a range having an upper value, a lower value, or upper and lower values including any of 8:1, 6:1, 4:1, 3:1, 2:1, 1.5:1, 1:1, 1:1.5, 1:2, 1:3, 1:4, 1:6, 1:8, or any values therebetween. For example, the output aspect ratio may be less than 8:1. In other examples, the output aspect ratio may be greater than 1:8. In yet other examples, the output aspect ratio may be between 8:1 and 1:8. In further examples, the output aspect ratio may be between 4:1 and 1:4. In yet further examples, the output aspect ratio may be between 2:1 and 1:2. In the embodiment illustrated in FIG. 4, the output aspect ratio may be 2:3. For example, the output pupil 222 may have an output pupil height 224-2 of 3.0 mm and an output pupil width 226-2 of 2.0 mm.

In some embodiments, the input pupil height 224-1 and output pupil height 224-2 may be oriented in the cross-scan direction. In other words, the first mirror may scan through a scan arc oriented in a plane in the direction of the input pupil width 226-1 and output pupil width 226-2. In at least some embodiments of relay optics 208, according to the present disclosure, the display light may undergo a magnification in the cross-scan direction, increasing the pupil height between the input pupil height 224-1 and the output pupil height 224-2. In some embodiments, the cross-scan magnification (i.e., output pupil height 224-2 to input pupil height 224-1) may be in a range having an upper value, a lower value, or upper and lower values including any of 12:1, 10:1, 8:1, 6:1, 4:1, 3:1, 2:1, 1.5:1, or any values therebetween. For example, the cross-scan magnification may be greater than 1.5:1. In other examples, the cross-scan magnification may be greater than 2:1. In yet other examples, the cross-scan magnification may be between 1.5:1 and 12:1. In further examples, the cross-scan magnification may be between 2:1 and 10:1. In yet further examples, the cross-scan magnification may be between 3:1 and 8:1. In the embodiment illustrated in FIG. 4, the cross-scan magnification may be 3:1. For example, the input pupil 220 may have an input pupil height 224-1 of 1.0 mm and the output pupil 222 may have an output pupil height 224-2 of 3.0 mm.

Figure 51:
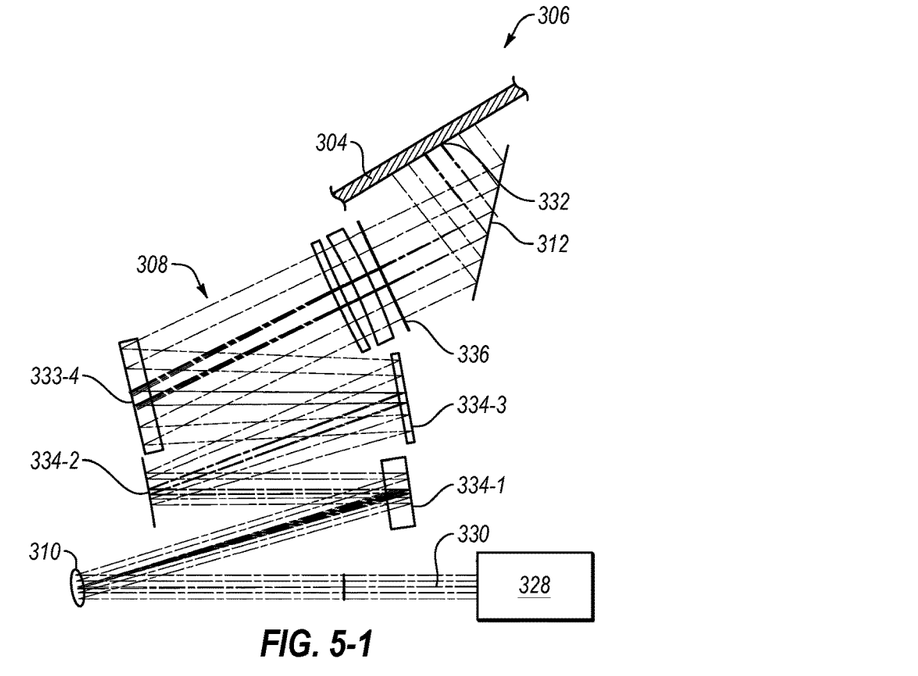
Figure 52:
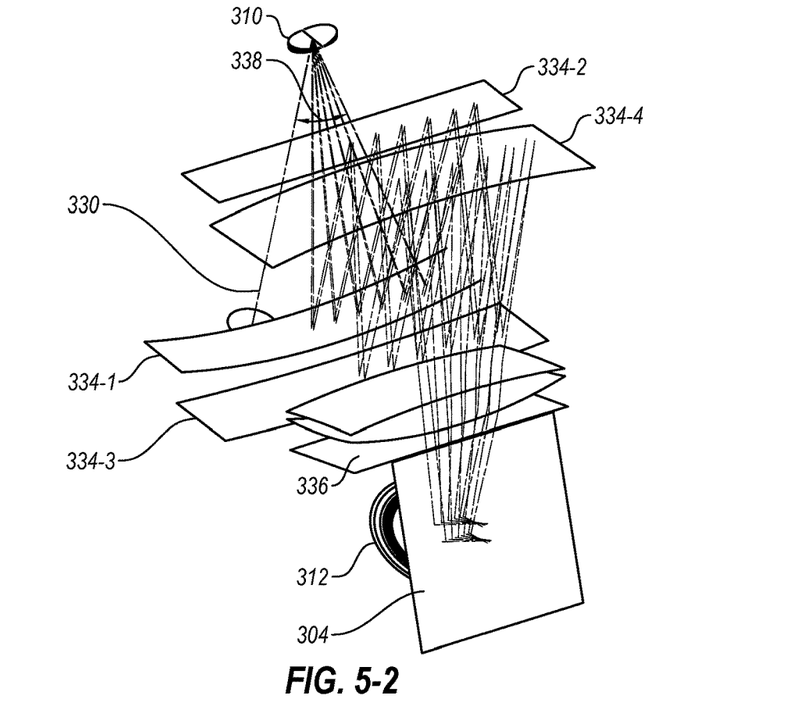

FIG. 5-1 and FIG. 5-2 illustrate an embodiment of relay optics 308, according to the present disclosure, that may be used in a light engine of a HMD (such as HMD 102 described in relation to FIG. 1) or in other electronic devices with visual displays. In some embodiments, a light engine 306 may include one or more light sources 328 configured to provide a display light 330 to an in-coupling optical element 332 of the waveguide 304.

In some embodiments, the one or more light sources 328 may be laser light sources. In other embodiments, the one or more light sources 328 may be light emitting diode light sources. In yet other embodiments, the one or more light sources 328 may be laser diodes. For example, the one or more light sources 328 may be solid-state laser light sources that produce a coherent display light upon application of threshold current to the laser diode.

The display light 330 from the one or more light sources 328 may be emitted and collimated. The collimated display light 330 may be directed toward a first mirror 310 that reflects the display light 330 while scanning through a first scan arc. The display light 330 may be magnified by one or more optical elements before the display light 330 is reflected from a second mirror 301 and/or in-coupled to the waveguide 304 and used to present visual information to a user.

In some embodiments, the relay optics 308 may include one or more reflective optical elements 334-1, 334-2, 334-3, 334-4, and/or one or more refractive optical elements 336. In some embodiments, the relay optics 308 may include both reflective optical elements and refractive optical elements, such as in the embodiment illustrated in FIG. 5-1. In other embodiments, the relay optics 308 may include only reflective optical elements. In yet other embodiments, the relay optics 308 may include only refractive optical elements. In some embodiments, the relay optics may include at least one non-circular symmetrical optical element, where the optical power in the scan direction is different from the optical power in the cross-scan direction. For example, the relay optics 308 may include cylinder optics, acylinder optics, toroidal optics, or freeform optics, etc.

Referring now to FIG. 5-2, the first mirror 310 is a fast scan mirror that scans in a fast scan arc 338. In some embodiments, the fast scan arc 338 may be about 15°, about 30°, about 45°, or about 60°. As the fast scan arc 338 increases, the forces on the fast scan mirror 310 necessary to move through the fast scan arc 338 with a frequency greater than 10 kHz, 20 kHz, or 30 kHz may begin to distort the fast scan mirror 310. Decreasing the size of the fast scan mirror 310 through magnification of the pupil size may limit and/or prevent distortion of the fast scan mirror 310.

The first reflective optical element 334-1 may be a cylinder mirror with optical power along the scan axis (i.e., in the plane of the scan direction). The first reflective optical element 334-1 may reflect the display light 330 toward a second reflective optical element 334-2. The second reflective optical element 334-2 may be a cylindrical optical element with a negative optical power along the cross-scan direction. In other words, the second reflective optical element 334-2 may magnify the display light 330 in the cross-scan direction while reflecting the display light 330 in the scan direction without altering the dimensions of the display light 330 in the scan direction.

The second reflective optical element 334-2 may reflect the display light 330 toward a third reflective optical element 334-3. The third reflective optical element 334-3 may be a planar mirror that allows the display light 330 to continue diverging in the cross-scan direction toward a fourth reflective optical element 334-4. The fourth reflective optical element 334-4 may be a cylinder mirror with a positive optical power in the scan direction to direct the display light 330 to begin to converge on the refractive optical element 336. The refractive optical element 336 may be a doublet that may assist in compensating for any cylindrical and/or spherical aberrations incurred during the optical path with cylindrical reflective optical elements. The refractive optical element 336 may direct the display light 330 toward and/or in the waveguide 304.

Figure 6:
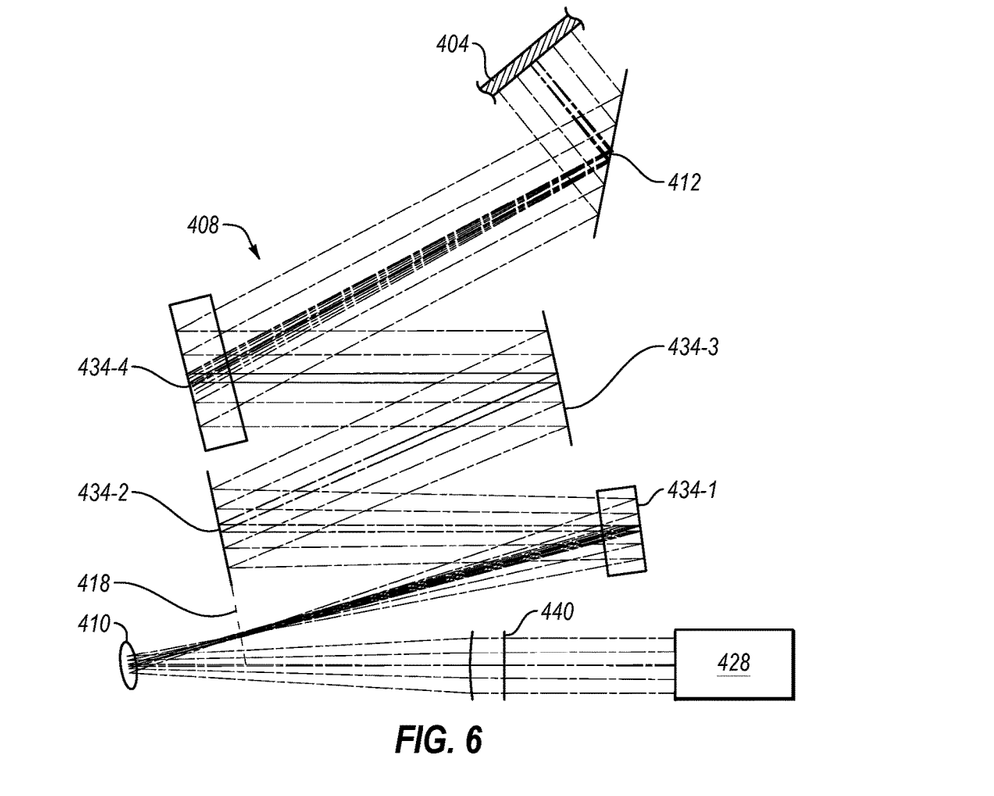
FIG. 6 is a side view of another example of anamorphic relay optics, according to some embodiments of the present disclosure.

FIG. 6 illustrates another embodiment of anamorphic relay optics 408, according to the present disclosure. In some embodiments, a display system including anamorphic relay optics 408 may include a convergent optical element 440 to focus the display light 430 toward the fast scan mirror 410. For example, a light source 428 may provide a display light 430 to a convergent optical element 440, which may be refractive as shown in FIG. 6 or reflective with an optical power in the cross-scan direction of the fast scan mirror 410. In some embodiments, the convergent optical element 440 may have a focal point after the fast scan mirror 410, such that the relay optics 408 have an intermediate image plane 418 optically after the fast scan mirror 410. In other embodiments, the convergent optical element 440 may have a focal point before the fast scan mirror 410, such that the display light is diverging in the cross-scan direction through the relay optics 408, similarly to as described in relation to FIG. 5-1 and FIG. 5-2. In yet other embodiments, the convergent optical element 440 may have a focal point at the fast scan mirror 410, such that the display light is diverging in the cross-scan direction through the relay optics 408 starting at the fast scan mirror 410.

In the embodiment illustrated in FIG. 6, the first reflective optical element 434-1 may be a cylinder mirror with optical power in the scan direction of the fast scan mirror 410. The fourth reflective optical element 434-4 may be an acylinder mirror with polynomial coefficients along the cylinder axis. The first reflective optical element 434 and fourth reflective optical element 434-4 may work in concert as the relay optics that relay the display light 430 to the slow scan mirror 412 with respect to the scan direction. The acylinder optics with polynomial coefficients along the cylinder axis may be difficult to produce and/or expensive. In other embodiments, the acylinder mirror of the fourth reflective optical element 434-4 may be a cylinder mirror, and a doublet refractive optical element, such as described in relation to FIGS. 5-1 and 5-2, may be positioned optically after the cylinder mirror to compensate for optical aberrations before the slow scan mirror 412.

The second reflective optical element 434-2 may be a planar mirror and the third reflective optical element 434-3 may be a cylinder mirror with optical power in the cross-scan direction. The third reflective optical element 434-3 and the convergent optical element 440 may work in concert to concentrate the display light 430 in the cross-scan direction at or near the fast scan mirror 410 and subsequently magnify the display light 430 in the cross-scan direction to the slow scan mirror 412 and, ultimately, the waveguide 404. For example, an embodiment of a display system with a convergent optical element 440 may allow a fast scan mirror that is smaller than the display light 430 as provided by the light source 428.

Figure 7:
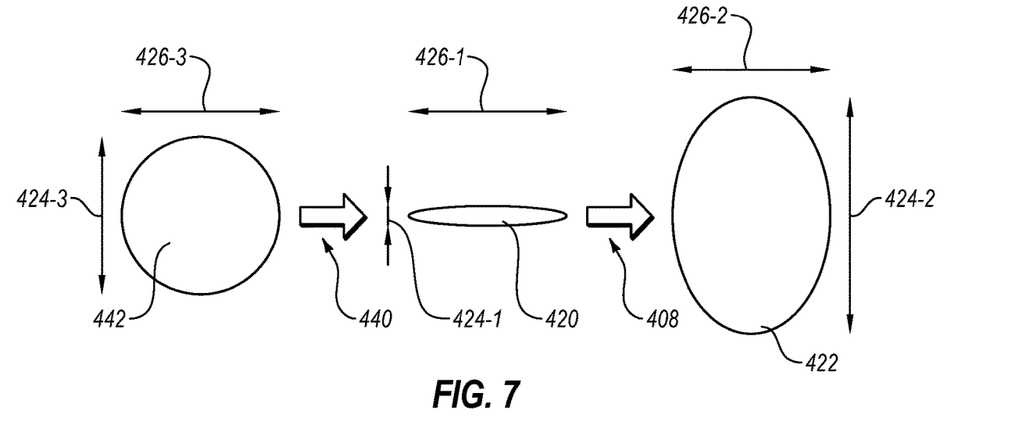
FIG. 7 is a schematic representation of light source, input, and output pupils of the anamorphic relay optics of FIG. 6.

FIG. 7 is a schematic representation of the changes in pupil size of the display light as provided from the light source and passing through the relay optics described in relation to FIG. 6. The light source may provide the display light with a light source pupil 442 having a light source pupil height 424-3 and light source pupil width 426-3. In some embodiments, the light source pupil 442 may have an aspect ratio of approximately 1:1. The convergent optical element 440 may reduce the pupil size in the cross-scan direction from the light source pupil height 424-3 to the input pupil height 424-1 of the input pupil 420 at the fast scan mirror. The pupil size in the scan direction may remain approximately the same from the light source pupil width 426-3 to the input pupil width 426-1. The display light may then pass through the relay optics 408, where the input pupil height 424-1 may increase to the output pupil height 426-2. The pupil size in the scan direction may remain approximately the same from the input pupil width 426-1 to the output pupil width 426-2.

In the illustrated embodiment, the input pupil height 424-1 before the relay optics 408 and the output pupil height 424-2 after the relay optics 408 may exhibit a twelve times magnification. For example, the input pupil height 424-1 may be about 0.25 mm and the output pupil height 424-2 may be about 3.0 mm.

In some embodiments, the output pupil 422 may have output pupil height 424-2 that is greater than the light source pupil height 424-3. For example, the illustrated embodiment has a light source pupil height 424-3 of 2.0 mm and an output pupil height 424-2 of 3.0 mm. In other embodiments, the output pupil 422 may have output pupil height 424-2 that is less than the light source pupil height 424-3. For example, a light source pupil height 424-3 may be 3.0 mm and an output pupil height 424-2 may be 2.0 mm. In yet other embodiments, the output pupil 422 may have output pupil height 424-2 that is approximately the same as the light source pupil height 424-3. For example, a light source pupil height 424-3 may be 2.0 mm and an output pupil height 424-2 may be 2.0 mm.

Figure 81:
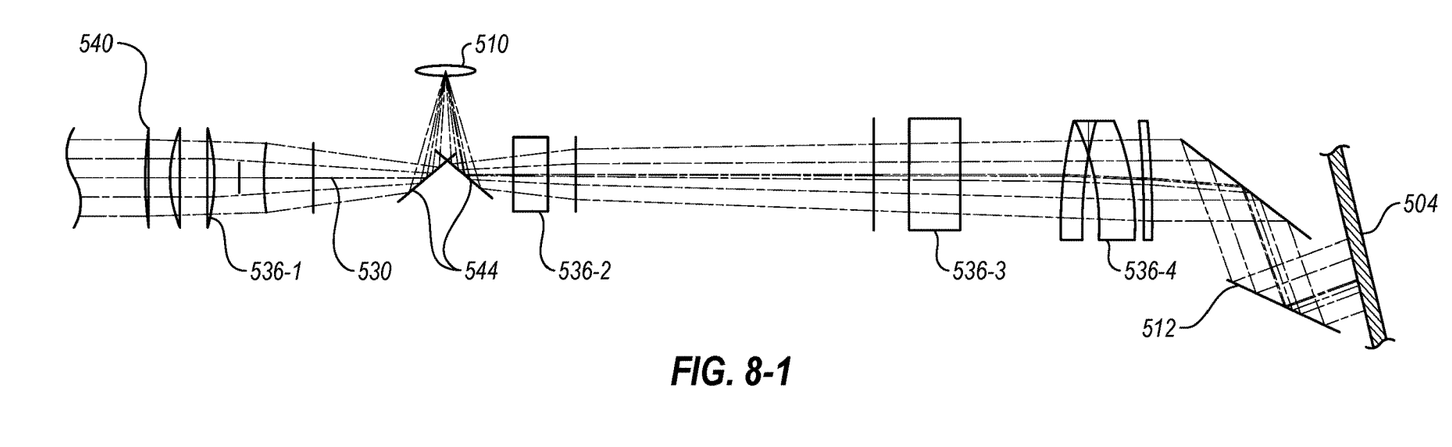
Figure 82:
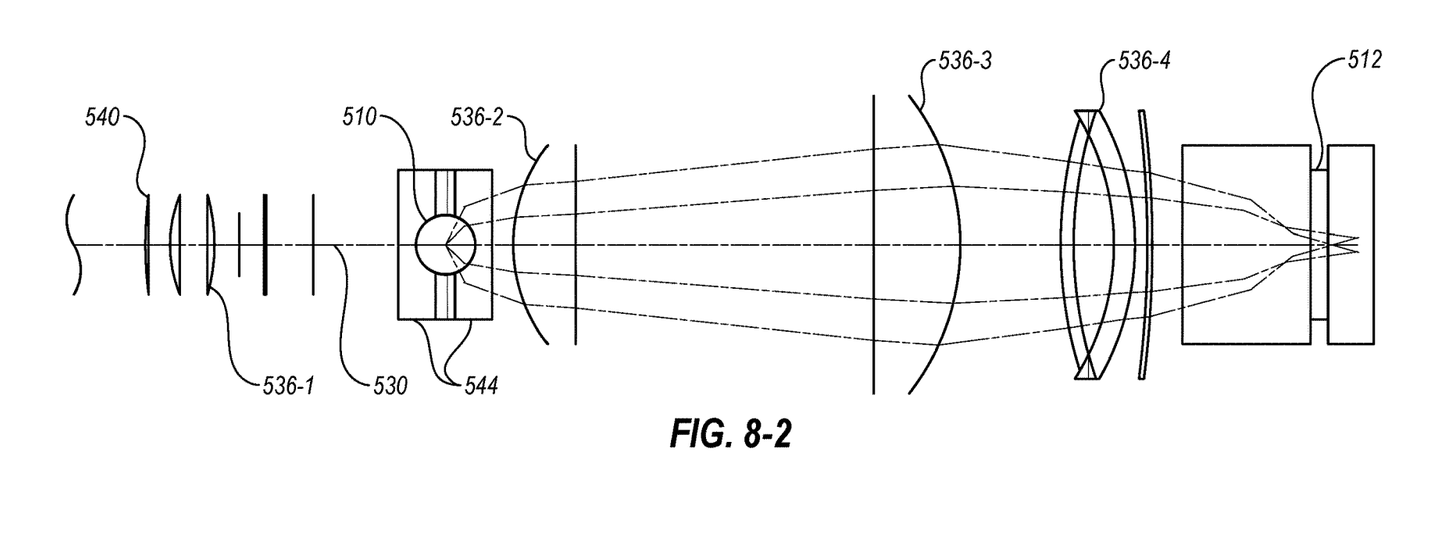

In other embodiments, the relay optics that magnify the display light in the cross-scan direction may be refractive optical elements. For example, FIGS. 8-1 and 8-2 illustrate a side view and top view of relay optics 508 including a plurality of refractive optical elements. In some embodiments, a convergent optical element 540 may be a cylinder lens with optical power along the cross-scan axis; the first refractive optical element 536-1 and the fourth refractive optical element 536-4 may be spherical doublet lenses; the second refractive optical element 536-2 and third refractive optical element 536-3 may be cylinder lenses with optical power along the scan axis. Two pick-off mirrors 544 may be positioned to fold the display light 530 in and out of the fast scan mirror 510. In such an embodiment, the first refractive optical element 536-1, second refractive optical element 536-2, third refractive optical element 536-3, and fourth refractive optical element 536-4 work as the relay optics in the scan axis as is visible in FIG. 8-2. Conversely, the convergent optical element 540, first refractive optical element 536-1, and fourth refractive optical element 536-4 may work as the beam expanding optics to magnify the pupil in the cross-scan direction before the second mirror 512 reflects the display light 530 toward the waveguide 504. Compared with embodiments utilizing reflective mirrors, refractive lenses may have large chromatic aberration and spherical aberration, and therefore multi-element lenses may be needed for a design with large field of view.

Figure 91:
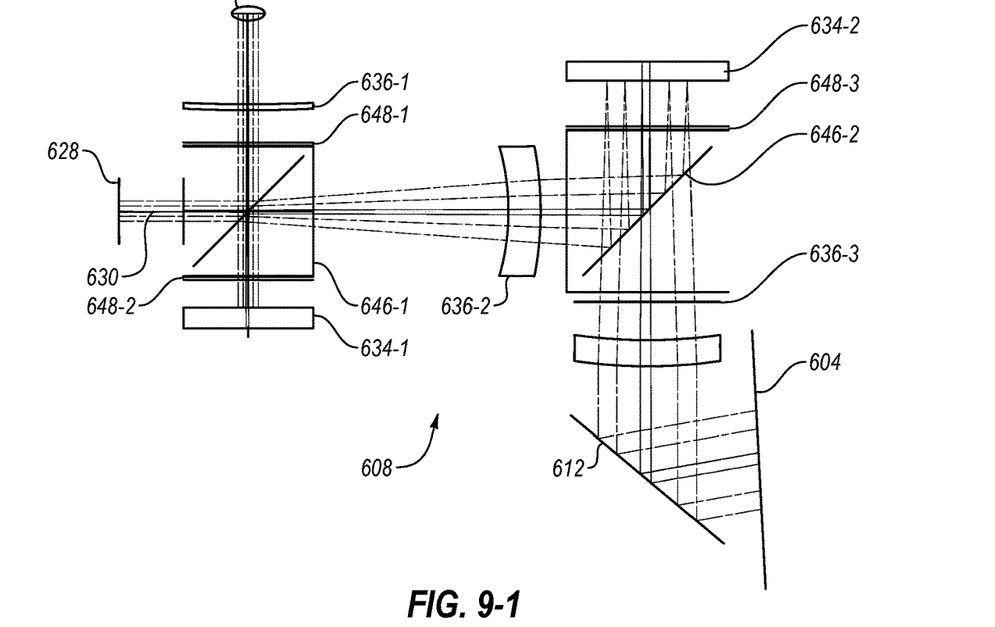
Figure 92:
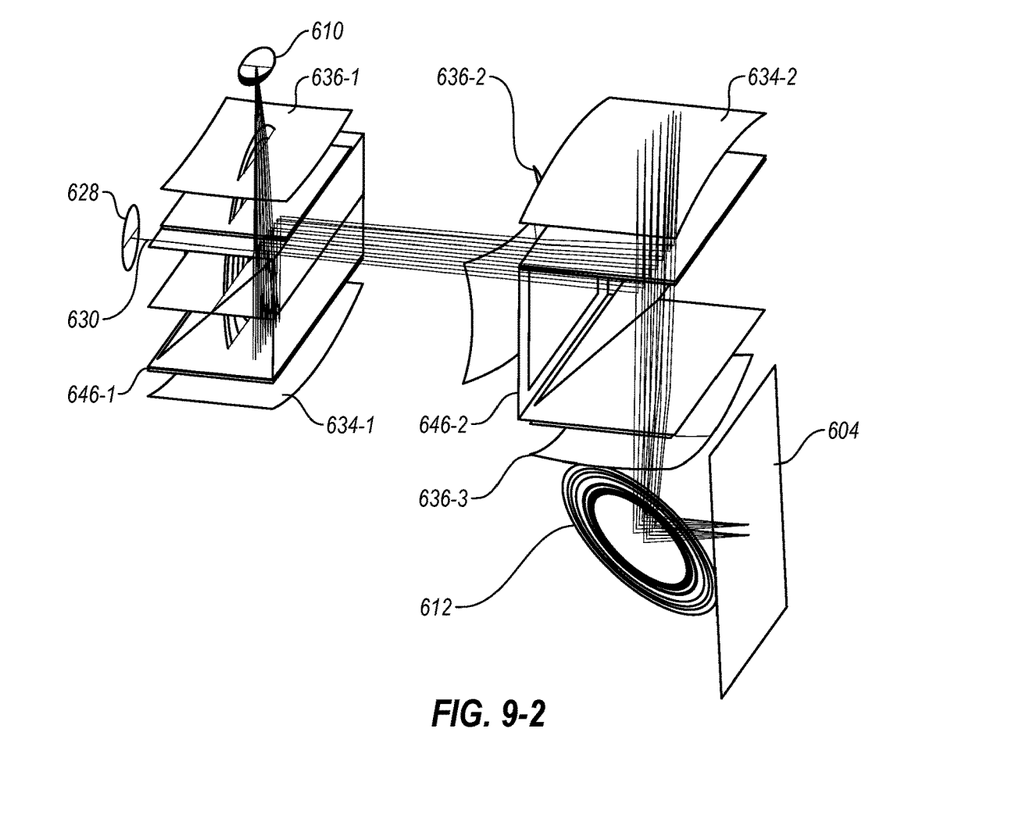

FIG. 9-1 and FIG. 9-2 illustrate yet another embodiment of relay optics 608 that may increase a pupil size in the cross-scan direction. A light source 628 may provide a display light 630 into a polarized beam splitter (PBS) that allows for the display light to be "doubled back" on itself within the relay optics to make a more compact arrangement of the relay optics. In some embodiments, the display light 630 may enter a first PBS 646-1 where the display light 630 may be reflected toward a first refractive optical element 636-1. Between the first PBS 646-1 and the first refractive optical element 636-1, a first layer of quarter wave film 648-1 may be laminated such that the display light 630 will pass through the quarter wave film 648-1 before entering the first refractive optical element 636-1. The first refractive optical element 636-1 may be a cylinder lens with optical power in the cross-scan direction.

The display light 630 may then encounter the fast scan mirror 610 and be reflected back toward the first refractive optical element 636-1. The display light 630 may pass through the first layer of quarter wave film 648-1 again, changing the polarization of the display light from S polarization to P polarization. The beam splitting surface of a PBS will reflect S polarization and pass P polarization, so the display light 630 that was reflected by the first PBS 646-1 off of the fast scan mirror 610 may now pass through the first PBS 646-1 and toward the first reflective optical element 634-1. The first reflective optical element 634-1 may be a cylinder mirror with optical power in the direction of the scan axis of the fast scan mirror 610.

A second layer of quarter wave film 648-2 may be positioned between the first PBS 646-1 and the first reflective optical element 634-1. Upon reflecting from the first reflective optical element 634-1, the display light 630 may pass through the second layer of quarter wave film 648-2 a second time, such that the display light 630 may, again, be reflected by the first PBS 646-1 and out toward the second refractive optical element 636-2.

A second refractive optical element 636-2 may be positioned optically before the second PBS 646-2. In some embodiments, the second refractive optical element 636-2 may be a spherical singlet to refract the display light 630 in the scan direction and the cross-scan direction. The second PBS 646-2 may first reflect the display light 630 toward the second reflective optical element 634-2, passing the display light 630 through a third layer of quarter wave film 648-3 on the way. The second reflective optical element 634-2 may be a cylinder mirror with optical power in the scan direction, which reflects the display light 630 through the third layer of quarter wave film 648-3 a second time, such that the display light 630 may pass through the second PBS 646-2. The display light 630 may, therefore, be transmitted through the second PBS 646-2 to a third refractive optical element 636-3. In some embodiments, the third refractive optical element 636-3 may be a spherical singlet to refract the display light 630 in the scan direction and the cross-scan direction. The display light 630 may then be reflected by the second mirror 612 toward the waveguide 604.

In the illustrated embodiment, the first reflective optical element 634-1, the second refractive optical element 636-2, the second reflective optical element 634-2, and the third refractive optical element 636-3 may have optical power in the scan direction and act as the relay optics of the display light 630 in the scan direction. The first refractive optical element 636-1, the second refractive optical element 636-2, and the third refractive optical element 636-3 may have optical power in the cross-scan direction and act as the beam expanding optics to magnify the pupil along the cross-scan direction. By relaying the display light through the first PBS 646-1 and second PBS 646-2, some embodiments of relay optics 608 according to the present disclosure may be able to arrange optical elements in a smaller space to reduce the volume and mass of the relay optics and, therefore, the light engine as a whole.

Figure 10:
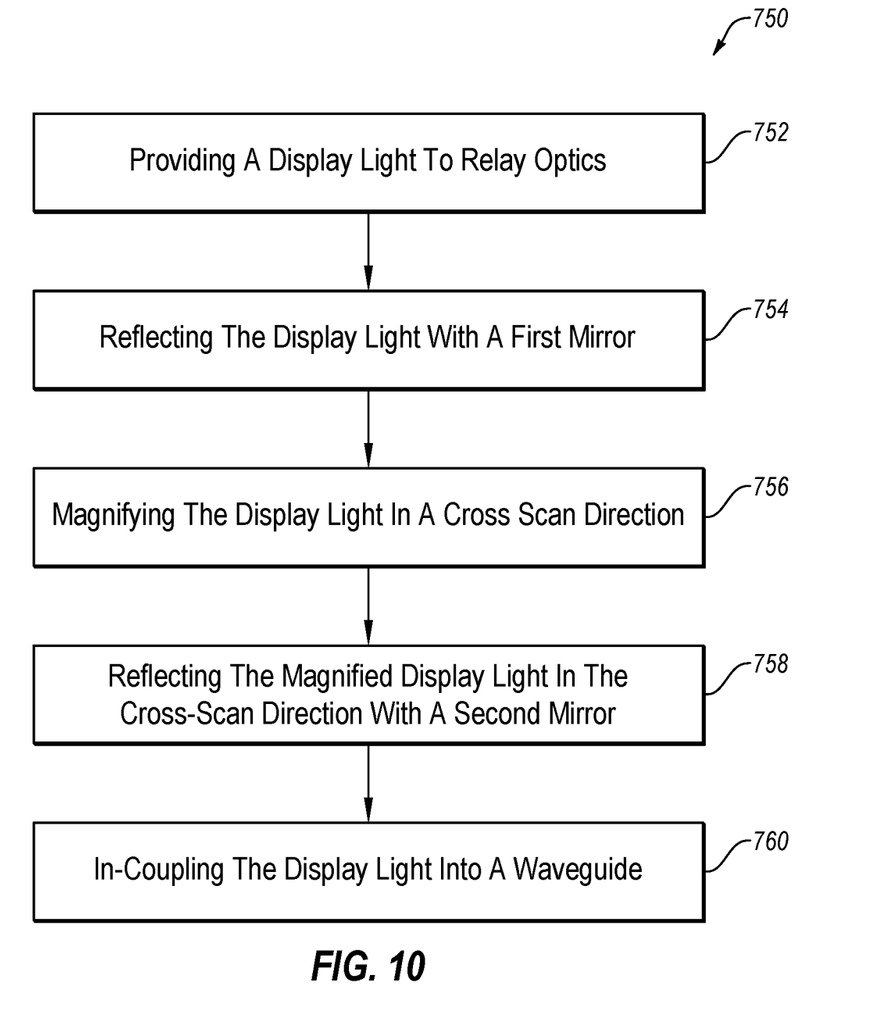
FIG. 10 is a flowchart illustrating a method of presenting visual information to a user, according to some embodiments of the present disclosure.

FIG. 10 is a flowchart 750 that depicts an embodiment of a method of displaying visual information to a user, according to the present disclosure. While example embodiments of optical relays have been described generally, herein, a method of displaying visual information may generally include providing a display light to the relay optics at 752 and reflecting the display light with a first mirror at 754. In some embodiments, the display light may be provided by one or more light sources directly to the relay optics. In other embodiments, the display light may be provided through a series of optical elements positioned between the one or more light sources and the relay optics. For example, the display light may pass through an optical element to converge the display light in at least one direction approaching the first mirror.

In some embodiments, the first mirror may be a MEMS mirror. The MEMS mirror may be a fast scan mirror with a scan frequency greater than 10 kHz, greater than 20 kHz, or greater than 30 kHz. The fast scan mirror may scan through a fast scan arc that is 15°, 20°, 30°, 45°, 60°, 75°, 90°, 100°, or any values therebetween. The fast scan mirror may reflect the light into one or more optical elements of the relay optics where the display light may magnify in a cross-scan direction at 756 perpendicular to the plane of the fast scan arc. The light may then be reflected in the cross-scan direction with a second mirror at 758. The second mirror may be a MEMS mirror and may be a slow scan mirror with a scan frequency less than the fast scan. For example, the slow scan mirror may have a scan rate of 12 Hz, 24 Hz, 30 Hz, 48 Hz, 60 Hz, 120 Hz, 240 Hz, or any values therebetween. In some embodiments, the increase in the pupil of the display light in the cross-scan direction between the fast scan mirror and the slow scan mirror may be greater than 1.5:1, 2:1, 3:1, 4:1, 6:1, 8:1, 10:1, or 12:1.

After reflecting the light with the second mirror moving in a slow scan arc in a cross-scan direction, the display light may be in-coupled into a waveguide at 760. The waveguide may then present the display light to a user to provide visual information on the waveguide to the user. In some embodiments, the systems and methods of presenting visual information to a user described herein may allow for a larger pupil size provided to a waveguide in a smaller, more reliable, and more energy efficient device. The larger pupil size may allow for a larger field of view for the waveguide, increasing the area over which visual information may be presented to a user and improving the user's experience.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A display system for presenting visual information to a user, the display system comprising:
    a fast scan mirror having a fast scan arc in a scan direction of a display light;
    a slow scan mirror having a slow scan arc in a cross-scan direction of the display light, wherein the slow scan mirror is larger than the fast scan mirror;
    a compression optical element positioned optically before the fast scan mirror, the compression optical element compressing a cross-sectional area of the display light in the cross-scan direction a greater amount than in the scan direction such that the cross-sectional area of the display light is less after the compression optical element and configured to direct the display light toward the fast scan mirror; and
    anamorphic relay optics positioned optically between the fast scan mirror and the slow scan mirror, the anamorphic relay optics configured to magnify the display light in the cross-scan direction to at least partially compensate for the compression of the display light of the compression optical element.

2. The display system of claim 1, further comprising a laser light source configured to provide the display light.

3. The display system of claim 1, further comprising a waveguide positioned optically after the slow scan mirror.

4. The display system of claim 1, the anamorphic relay optics including at least one reflective optical element.

5. The display system of claim 1, the anamorphic relay optics including at least one refractive optical element.

6. The display system of claim 1, the anamorphic relay optics including at least one reflective optical element and at least one refractive optical element.

7. The display system of claim 1, the compression optical element being a cylinder optical element.

8. The display system of claim 1, an input display light at the fast scan mirror and an output display light at the slow scan mirror having a magnification ratio greater than 3:1.

9. A display system for presenting visual information to a user, the display system comprising:
    a laser light source configured to provide a display light;
    a fast scan mirror having a fast scan arc in a scan direction of the display light;
    a slow scan mirror having a slow scan arc in a cross-scan direction of the display light;
    anamorphic relay optics positioned optically between the fast scan mirror and the slow scan mirror, the anamorphic relay optics including at least one non-circular symmetrical optical element, where an optical power in the scan direction is different from an optical power in the cross-scan direction configured to magnify the display light in at least the cross-scan direction, wherein the anamorphic relay optics include at least one polarizing beam splitter; and
    a waveguide positioned and configured to receive output display light from the slow scan mirror and in-couple the display light into the waveguide.

10. The display system of claim 9, the fast scan mirror having a scan rate of at least 10 kilohertz (kHz).

11. The display system of claim 9, the slow scan mirror having a scan rate of at least 12 Hertz (Hz).

12. The display system of claim 9, further comprising a cylinder optical element positioned between the laser light source and the fast scan mirror.

13. The display system of claim 9, the at least one non-circular symmetrical optical element includes a cylinder optical element, an acylinder optical element, a toroidal optical element, or a freeform optical element.

14. The display system of claim 9, the anamorphic relay optics including only refractive optical elements.

15. The display system of claim 9, the anamorphic relay optics including only reflective optical elements.

16. A method of presenting visual information to a user, the method comprising:
    providing a display light having a cross-sectional area to anamorphic relay optics;
    compressing the display light in a cross-scan direction such that the display light has an aspect ratio greater in a scan direction than the cross-scan direction and such that the cross-sectional area of the display light is reduced after compressing the display light;
    reflecting the display light with a first mirror in a first scan arc in the scan direction;
    magnifying the display light in the cross-scan direction with a plurality of optical elements in the anamorphic relay optics to create a magnified display light, the cross-scan direction being perpendicular to the scan direction;
    reflecting the magnified display light with a second scan mirror in a second scan arc in the cross-scan direction to create an output light; and
    in-coupling the output light into a waveguide.

17. The method of claim 16, further comprising polarizing the display light.

18. The method of claim 16, the display light magnified by an acylinder optical element.

19. The method of claim 16, further comprising focusing the display light to an intermediate image plane.

20. The display system of claim 12, the cylinder optical element being configured to compress a cross-sectional area of the display light in the cross-scan direction a greater amount than in the scan direction such that the cross-sectional area of the display light is less after the compression optical element.

\* \* \* \* \*